United States Patent
Takemura (10) Patent No.: US 6,947,599 B2
(45) Date of Patent: Sep. 20, 2005

(54) APPARATUS AND METHOD FOR IMAGE COMPRESSION USING A SPECIFIED RESTART INTERVAL

(75) Inventor: Narihira Takemura, Kanagawa (JP)

(73) Assignee: NEC Electronics Corporation, Kanagawa (JP)

(*) Notice: Subject to any disclaimer, the term of this patent is extended or adjusted under 35 U.S.C. 154(b) by 653 days.

(21) Appl. No.: 09/900,607

(22) Filed: Jul. 6, 2001

(65) Prior Publication Data

US 2002/0006227 A1 Jan. 17, 2002

(30) Foreign Application Priority Data

Jul. 11, 2000 (JP) ........................................ 2000-209987

(51) Int. Cl.[7] .............................. G06K 9/36; H03M 7/00
(52) U.S. Cl. ........................................ 382/232; 341/50
(58) Field of Search .............................. 382/232, 233, 382/238; 358/1.15; 375/240.12, 240.13, 240.27, 240.28, 241; 714/48, 52; 341/50; 712/300

(56) References Cited

U.S. PATENT DOCUMENTS 5,379,070 A * 1/1995 Retter et al. ............. 375/240.2
5,671,156 A * 9/1997 Weerackody et al. ......... 714/52
6,049,390 A * 4/2000 Notredame et al. ........ 358/1.15
6,668,086 B1 * 12/2003 Enokida ..................... 382/233

FOREIGN PATENT DOCUMENTS

| JP | 6-292022 | 10/1994 | ............ H04N/1/41 |
| JP | 8-32821 | 2/1996 | .......... H04N/1/415 |
| JP | 8-63605 | 3/1996 | ............ G06T/9/00 |
| JP | 9-247423 | 9/1997 | .......... H04N/1/387 |
| JP | 2000-32460 | 1/2000 | ............ H04N/7/30 |

OTHER PUBLICATIONS

Yasuda, K., "International Standards for Multi-Media Encoding", Maruzen (1991), pp. 38–39.

* cited by examiner

*Primary Examiner*—Wenpeng Chen
(74) *Attorney, Agent, or Firm*—Scully, Scott, Murphy & Presser (57) ABSTRACT

There is provided means for setting the RST insertion position comprising a restart line interval setting register 13 automatically setting the insertion position of the RST to the head of the scanning line with the least correlation between two image data for each of the interval L of the arbitrarily set scanning line and a restart interval calculation portion 5. With this structure, a reduction in the compression rate on the basis of the insertion of the RST can be avoided and a high compression rate can be attained.

6 Claims, 9 Drawing Sheets

EACH ELEMENT
SAMPLE RATIO 4:4:4

0 ~ 7 : RST0~7

CORRELATION OF DC COEFFICIENT
A, B : HIGH CORRELATION
C, D : LOW CORRELATION

Fig. 8A

0~7 : RST0~7

Fig. 8B

0~7 : RST0~7

Fig. 9

APPARATUS AND METHOD FOR IMAGE COMPRESSION USING A SPECIFIED RESTART INTERVAL

BACKGROUND OF THE INVENTION

1. Field of the Invention

The present invention relates to an image compressing device and an image compressing method, and particularly to an image compression technique with respect to still pictures.

2. Description of the Related Art

As an international standard concerning compression/expansion method of still pictures, there is available a JPEG method which ISO and CCITT experts group ISO/IEC, JTC1/SC2/WG (Joint photographic Experts Group) has regulated as recommended ITU-T Rec. T81 ISO/IEC-10918-1.

Figure 1:
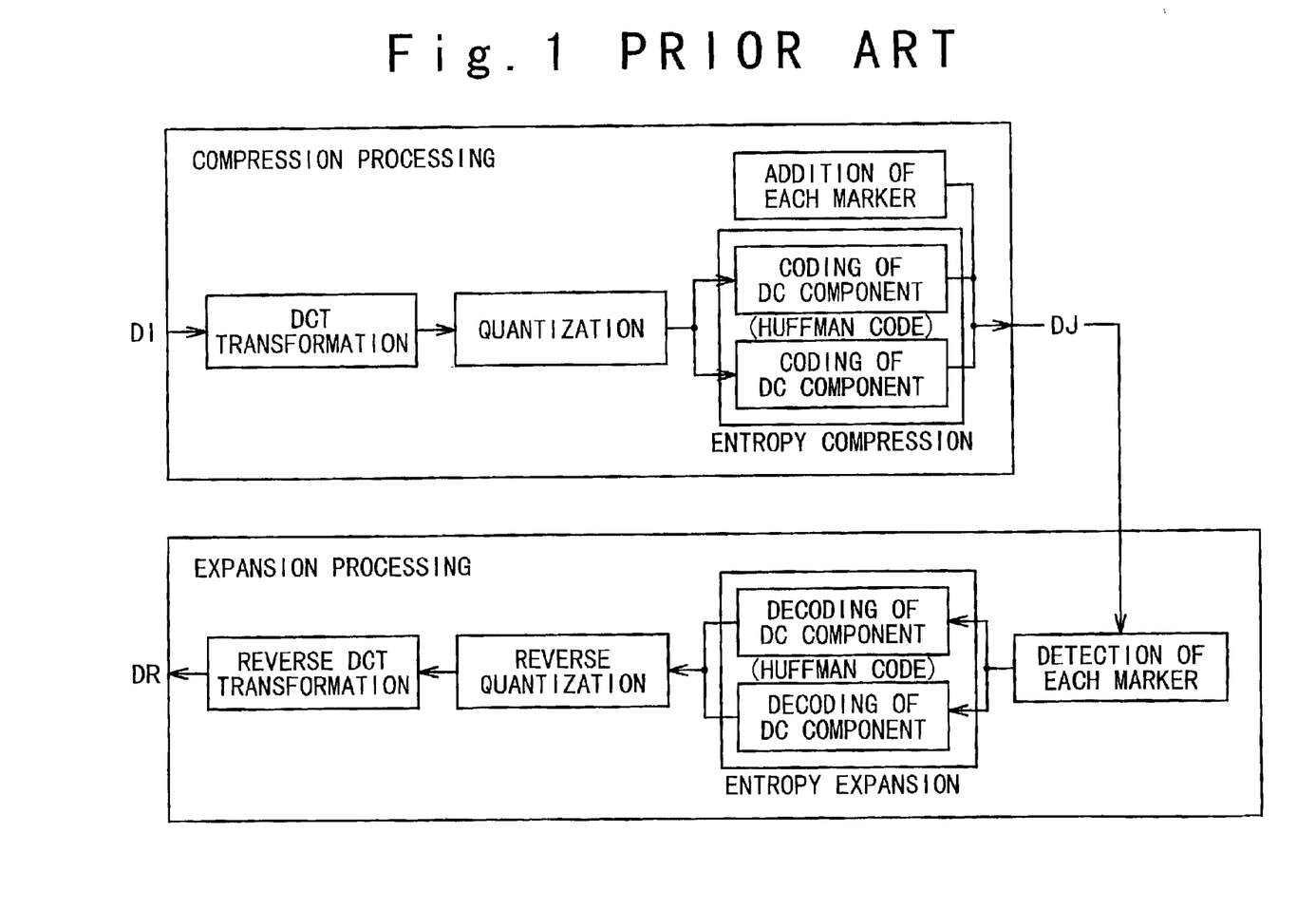
FIG. 1 is an explanatory view conceptually showing a compression/expansion process of the JPEG method.

FIG. 1 is an explanatory view conceptually showing compression/expansion processing of the JPEG method. In the compression processing, basically, the image data DI is compressed in three stages; (1) discrete cosine transformation (DCT), (2) quantization, and (3) entropy compression to thereby generate the JPEG compression data DJ. Furthermore, in the expansion processing, on the contrary, the compressed data DJ is expanded at each stage of the (4) each marker detection, (5) entropy expansion, (6) reverse quantization and (7) reverse DCT to thereby create expanded image data DR.

Here, (1) the DCT is a processing of decomposing image data into a frequency coefficient, (2) the quantization is processing of cutting down information quantity in a direction of actively reducing high frequency to which the sensitivity of man's eyes is low from the DCT coefficient data obtained by the DCT, and (3) entropy compression refers to generally known reversible compression/expansion, and in base line DCT, technique based upon the known Huffman encoding regulation is used.

Furthermore, in the JPEG method, there are many cases in which compression/expansion processing is conducted in a color space such as luminance, color difference 1 and color difference 2 (YCbCr, YUV or the like) to further heighten compression rate by changing a sampling ratio in each color space. For example, in the case where the original color image data is composed of three original color, red, green and blue (R, G, B) signal, a method is used in which the color signal is converted into a luminance color difference (Y, Cb, Cr or the like) signal followed by compressing the signal and converted the signal again into R, G, B signal after expansion.

In this method, such a fact is used that the man's eyes are insensitive to the color difference coefficient rather than the luminance coefficient. That is, the data quantity is decreased by reducing the sampling ratio of the color difference coefficient as against the luminance coefficient (thinning out image data) and the compression rate is raised.

An image data unit comprising 8×8 pixels is referred to as a block, also the minimum unit image data for conducting image compression processing is referred to as minimum coded unit (hereinafter referred to as MCU).

Figure 2A:
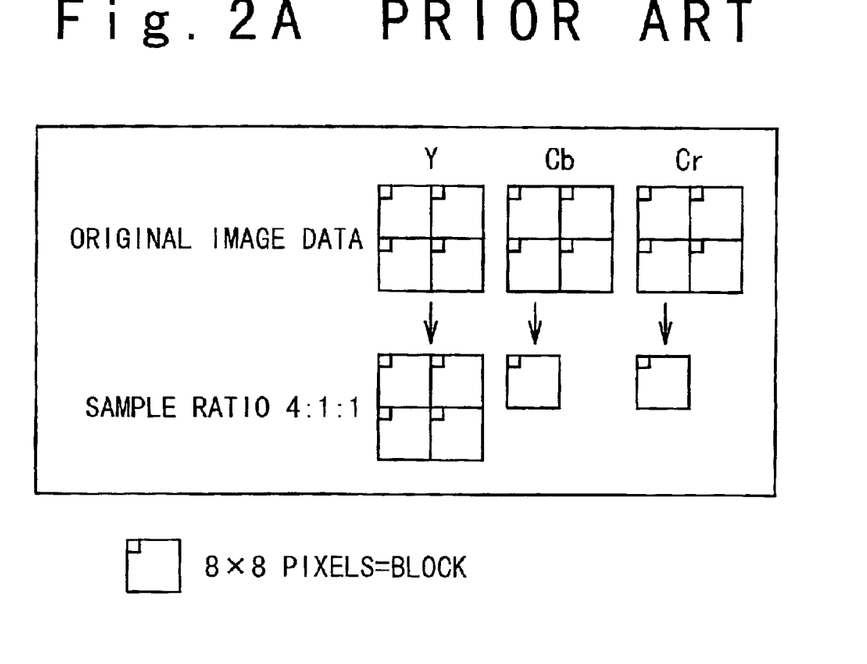
FIGS. 2A and 2B are explanatory views schematically showing a relation between a MCU and data sampling of compressed image data of the JPEG method.
Figure 2B:
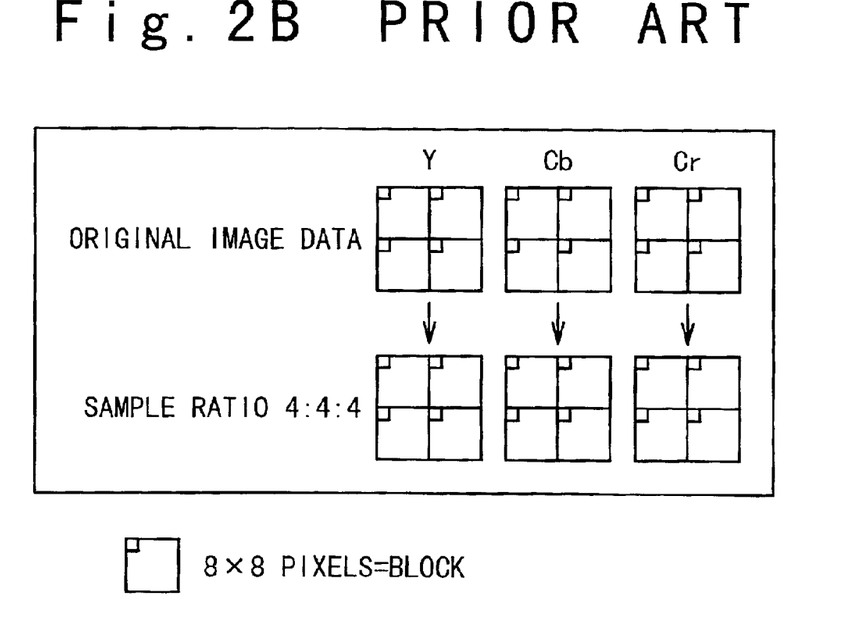

FIGS. 2A and 2B are explanatory views schematically showing a relation between data sampling and MCU. There exists a form such as "a sampling ratio of 4:1:1" shown in FIG. 2A for sampling four blocks of luminance signal Y and one block of the color difference signals Cb and Cr respectively from one MCU, or another form such as "a sampling ratio of 4:4:4" shown in FIG. 2B for sampling one block of the luminance signal Y and the color difference signal Cb and Cr respectively from one MCU, or the like.

Figure 3A:
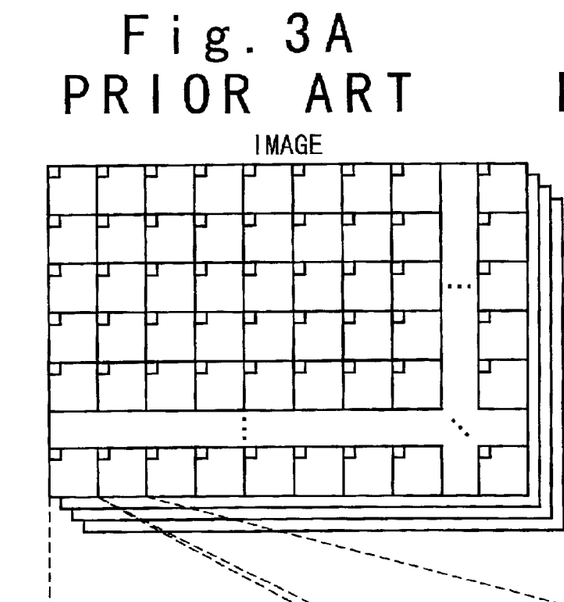
FIGS. 3A to 3D are explanatory views schematically showing a concept of an image block of the compressed image data of the JPEG method.
Figure 3B:
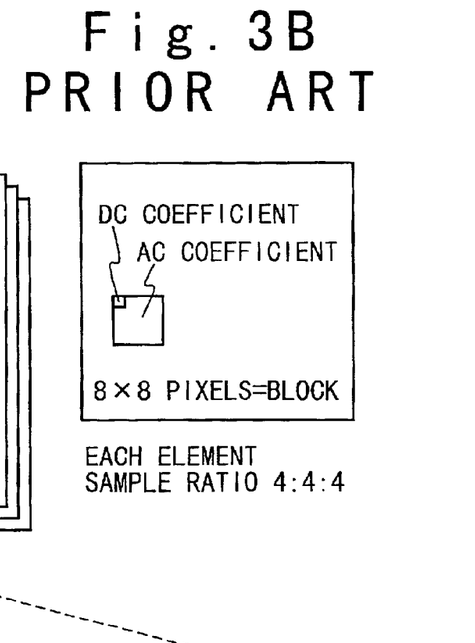

FIGS. 3A and 3B are views for schematically showing the concept of the image block of the compressed image data of the JPEG method. In the JPEG method, as shown in FIG. 3A, an original image composed of arranging the above described block comprising 8×8 pixels in a vertical and a horizontal direction is subsequently subjected to DCT and quantization in the block unit. From a difference in the characteristic of the first one pixel and other 63 pixels in the each block, as shown in FIG. 3B, the first pixel is referred to as a direct current coefficient (hereinafter referred to as "DC coefficient") and the remaining 63 pixels are referred to as an alternate current coefficient (hereinafter referred to as "AC coefficient").

In the DC coefficient and the AC coefficient, the absolute value of the numeric value and the distribution thereof differ from each other. While the absolute value of the AC coefficient is relatively small, the absolute value of the DC coefficient tends to become relatively large. This is because the DC coefficient shows the average value of the block.

In the case where the sampling ratio is 4:4:4 shown in FIG. 2B, the DC coefficient is compressed through entropy coding after determining a differential value with the DC coefficient of the block one ahead for each of the coefficient (Y, Cb, Cr or the like).

Figure 3C:
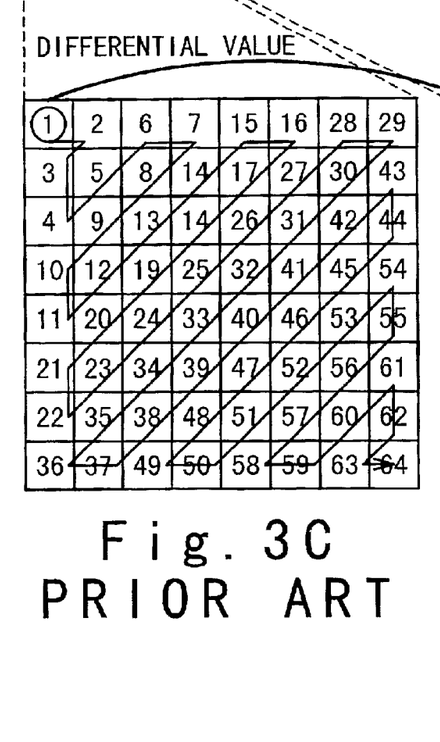
Figure 3D:
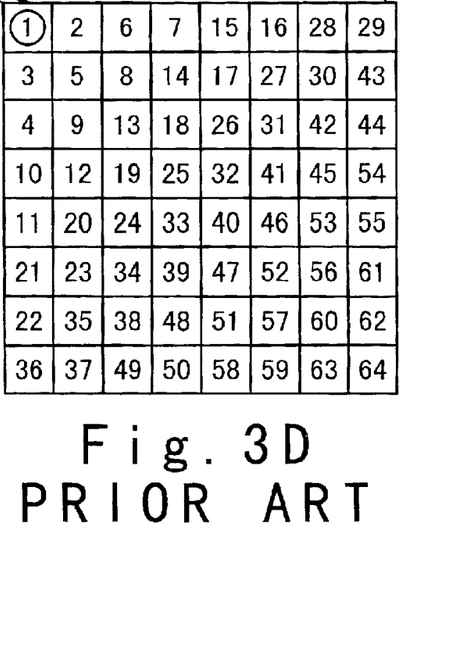

As shown in FIG. 3C, a scanning order at the time of sampling the original image in the JPEG method has a specification such that the original image is scanned horizontally from the left to the right in the MCU unit, and when the right end is attained, the scanning process is lowered by one step in the MCU unit so that the original image is scanned horizontally again in the MCU unit from the left to the right so that such process is repeated up to the end of the image data. As shown in FIG. 3C, the AC coefficient is obtained such that values of pixels are scanned in a zigzag manner in the order of 2, 3, 4, . . . 63 and 64 and the values are entropy compressed with a combination of the zero run length (=0 run length value) of the scan data and a coefficient value which is not zero.

The entropy compression is compression on the basis of the Huffman coding regulation. The Huffman table, which is generally used, has a short code length on the whole when the value of each coefficient is smaller. When the value of each coefficient is larger, the code length tends to become longer. Consequently, when the value of each coefficient is smaller, the compression rate becomes higher.

Incidentally, the reason why the DC coefficient assumes a differential value with the DC coefficient of the block one ahead unlike the AC coefficient is that the value at the time of prediction coding as differential information becomes smaller, and the compression rate at the time of entropy compression coding is raised because it is thought that images continue and have a high correlation generally with respect to adjacent DC coefficients.

However, since the DC coefficient always assumes data differential between front and rear blocks, there arises in some cases a problem in that an expansion error is generated in which the following DC coefficient data cannot be accurately expanded in the case of the generation of data error in the communication or the like.

Figure 4A:
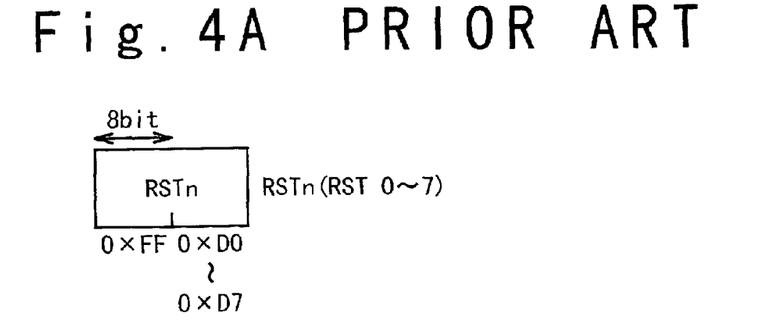
FIGS. 4A to 4C are explanatory views schematically showing a concept of a restart marker, a restart interval marker, and an insertion position of the restart marker of the conventional image compressing apparatus respectively.

In order to settle this problem, conventionally, a device is made to allow a normal expansion of the MCU next to the restart marker (hereinafter, referred to as "RST") as shown in FIG. 4A even when data error is caused in the midway rather than inserting the RST in an arbitrary interval of the MCU unit in the data stream.

The RST has a function of disconnecting the chain action of the differential compression associated with the DC coefficient, and the DC coefficient immediately after the RST is designed to entropy coding and compressing the result of taking a differential with zero.

Consequently, in the case where the RST appears at the time of the expansion, a device is made in such a manner that it is not required to calculate the DC coefficient immediately after the RST by using a DC coefficient of the block one ahead, and data can be expanded only with the block.

However, the insertion of the RST into the data stream has an advantage described above while having a problem in that the compression rate of the direct current coefficient of the image is decreased for the following reason.

As described above, the RST once suspends the chain of the differential compression of the DC coefficient to allow data before and after the data to be independent by taking the differential with zero to enable the restart of a normal expansion. Thus, differential value (in actuality the DC coefficient of the block is reflected therein as it is) of the direct current immediately after the insertion of the RST is enlarged. As a result, the compression rate is reduced. In particular, in the case where the RST is inserted into the position where the correlation between front and rear images is strong, a penalty is large in the reduction of the compression rate of the DC coefficient.

Figure 4B:
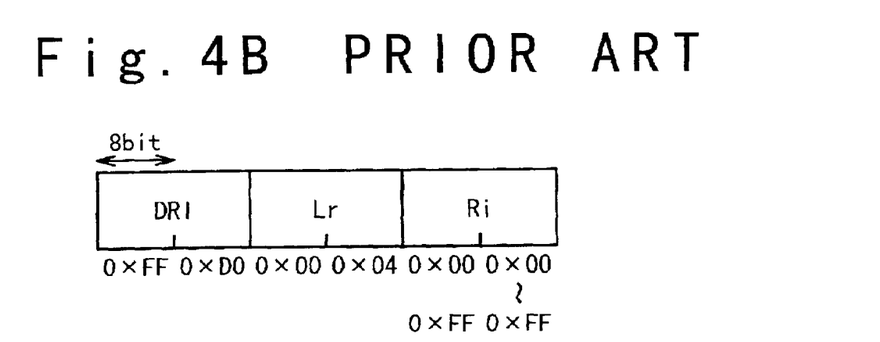
Figure 4C:
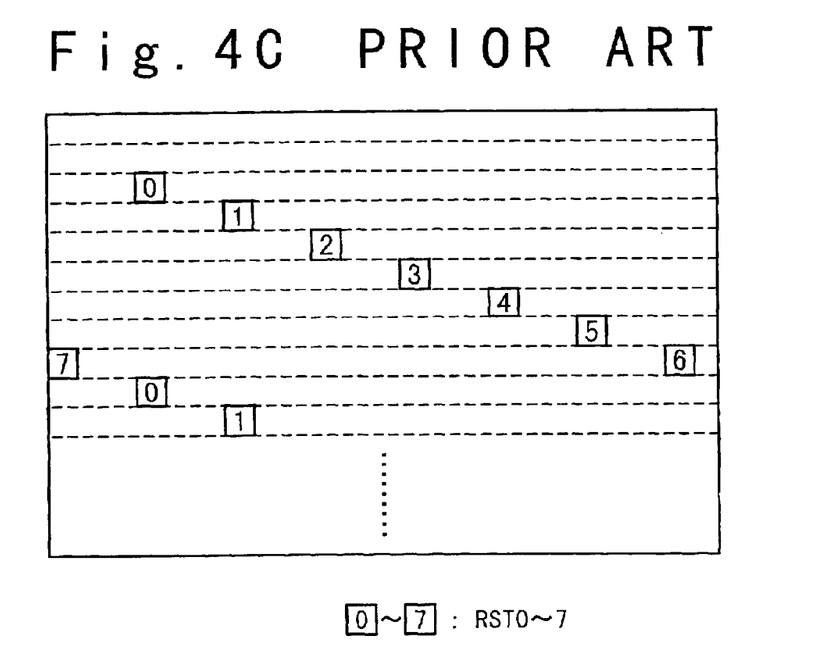

FIGS. 4A to 4C schematically show the concept of the RST, a restart interval marker, a RST insertion position by the conventional image compressing apparatus, respectively. As shown in FIG. 4A, the RST comprises 16 bits, and a total of seven kinds of markers exist such as 0xFF, 0xD0 to 0xD6 and 0xD7. (Hereinafter described as RST0, RST1, RST2, . . . RST7 in order of the marker of 0xFF, 0xD0 to 0xD6 and 0xD7).

In the case where the RST is inserted into the image data stream, as shown in FIG. 4C, the RST is inserted in the order of RST0, RST1, RST2, . . . . Nest to the RST7, the RST is inserted again in the order of RST0, RST1 and RST2 . . . .

Incidentally, as shown in FIG. 4B, the insertion interval of the RST is defined at the Ri portion (lower 16 bits and the unit set in the MCU unit) of the restart interval marker (DRI) composed of 48 bits, and is added to the header portion of the JPEG format as restart interval information.

Figure 5:
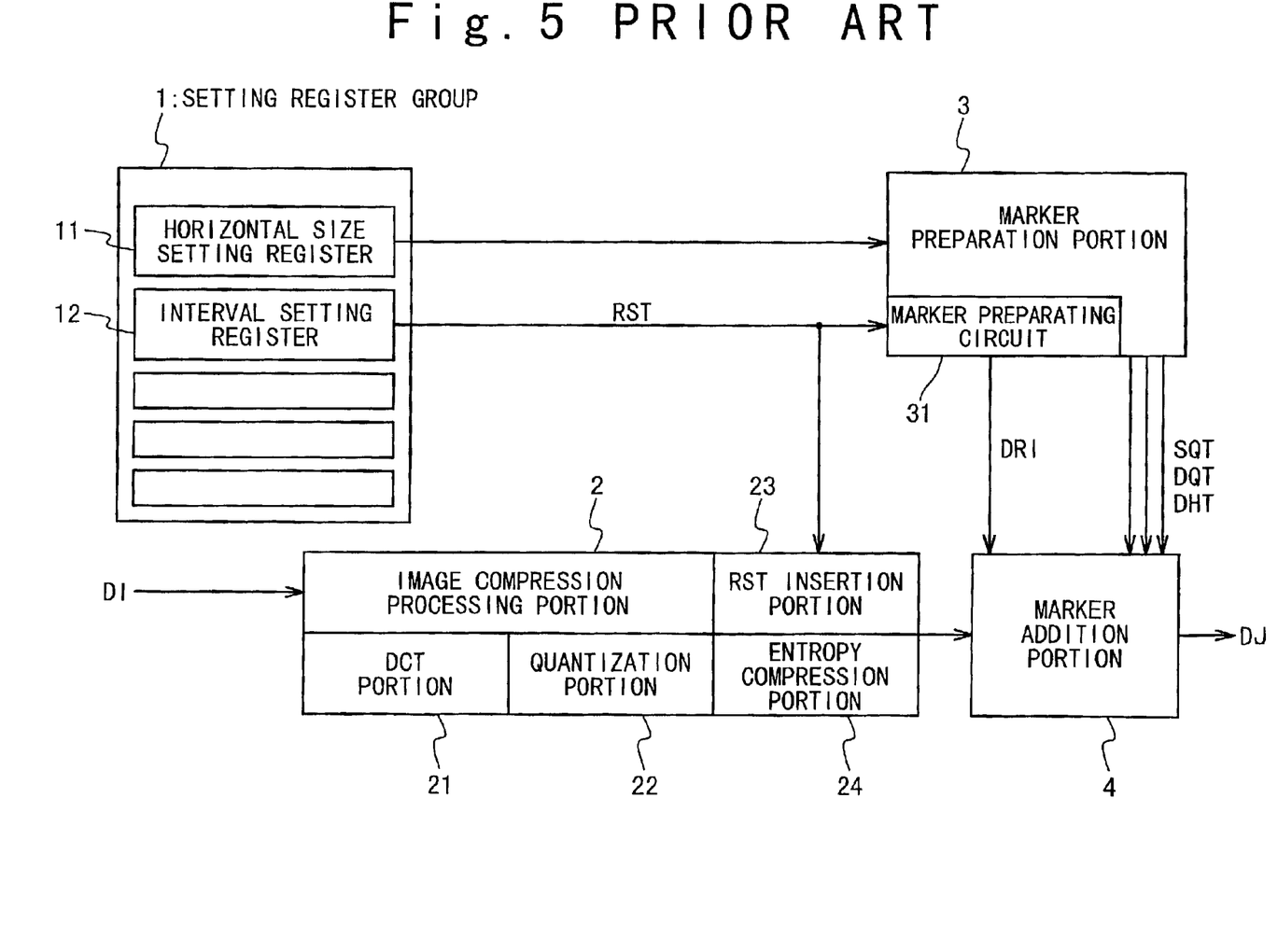
FIG. 5 is a block diagram showing one example of the conventional image compressing apparatus.

FIG. 5 is a block diagram showing a general conventional image compressing apparatus employing the JPEG method. This conventional image compressing apparatus comprises: a setting register group 1 including a horizontal size setting register 11 for setting a horizontal size of the image and an interval setting register 12 for setting restart interval in a MCU unit or the like; an image compression processing portion 2 for conducting DCT processing and quantization of the image data DI and conducting entropy compression while inserting RST in a set interval; a marker preparation portion 3 for preparing a plurality of kinds of markers including a restart interval marker (DRI) on the basis of the set value of the set register group 1; and a marker addition portion 4 for adding a plurality of kinds of markers to the compressed image data prepared at the image compression processing portion 2 to output the data as JPEG format image data DJ.

The image compression processing portion 2 comprises a DCT portion 21 for conducting DCT processing, a quantization portion 22 for quantization, a RST insertion portion 23 for inserting a restart marker (RST), and an entropy compression portion 24 for conducting entropy compression processing.

The marker preparation portion 3 includes a marker preparing circuit 31 for preparing DRI on the basis of the set value of the interval setting register 12.

Next, referring to FIG. 5, there will be explained an operation of the conventional image compression apparatus and an image compression method. A predetermined set value is set at each of the setting registers 11, 12 of the setting register group 1. That is, the number of horizontal pixels of the image required for compression operation is set in the horizontal size setting register 11. In the interval setting register 12, the restart interval value is set in the MCU unit. Next, the image compression processing portion 2 conducts quantization by subjecting the inputted image data DI to the DCT processing. Furthermore, entropy compression is conducted while inserting the RST in the restart interval that is set in the interval setting register 12.

The marker preparation portion 3 prepares a plurality of kinds of markers on the basis of the set value of the setting register group 1. That is, the marker preparing circuit 31 prepares DRI based on the setting value of the interval setting register 12.

The marker addition portion 4 adds a plurality of kinds of markers including the DRI to the compressed image data prepared at the image compression processing portion 2 to output the data as the JPEG format image data DJ.

As shown in FIG. 3C described above, a scanning order at the time of sampling an original image in the JPEG method is set in such a manner that the original image is scanned from left to right in the scanning line (one line) of MCU unit so that when the scanning attains the right end the scanning is lowered by one line, and an operation of scanning the original image from left to right horizontally by one line is repeated up to the end of the image data.

Figure 6:
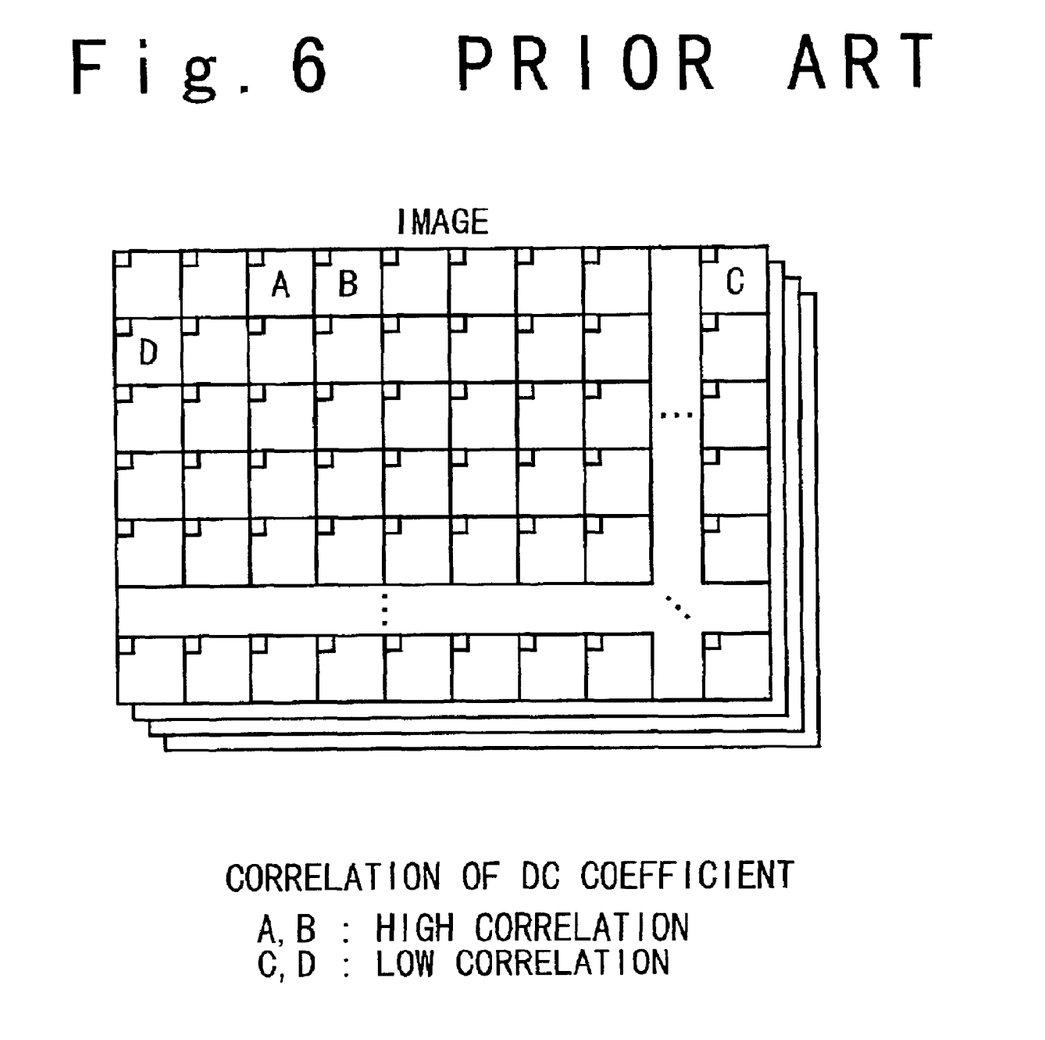
FIG. 6 is an explanatory view schematically showing a concept of a correlation of a DC coefficient in the case that images continue.

FIG. 6 schematically shows a concept of correlation of the DC coefficient in the case that the image continues. There will be explained a degree of penalty in the reduction of compression rate by the insertion position of the RST. In the case where the image continues like two images A and B having continuous data, it is thought that a correlation of the DC coefficient showing an average value in the MCU unit is generally high and a differential compression rate is also high, so that a penalty exerting an influence upon the reduction in the compression rate is extremely high at the time of the insertion of the restart marker between these images A and B.

In the image compressing apparatus and the image compressing method which have been described above, a restart marker (RST) is inserted into the data stream in an arbitrary interval of the MCU unit in order to avoid the expansion error of the DC coefficient data caused by the data error. However, the RST has a function of interrupting a chain of a differential compression associated with the DC coefficient. Thus, in the case that the RST is inserted into the position where a correlation between front and rear images is strong, there is a disadvantage in that a differential value of the direct current coefficient immediately after the insertion of RST becomes large. As a result, the compression rate is reduced.

As a related art, Japanese Laid Open Patent Application (JP-A-Heisei, 8-32821) discloses an image compressing system and an image reproduce system. In the image compressing system and the image reproduce system, a partial reproduce of the image data can be performed at high speed.

Also, Japanese Laid Open Patent Application (JPA 2000-32460) discloses a method for producing selective image view and a apparatus thereof. In this technique, a partial image is produced from a large compressed image or a plurality of images.

SUMMARY OF THE INVENTION

Therefor, an object of the present invention is to provide an image compressing apparatus and a image compressing method which are capable of avoiding a reduction in the compression rate on the basis of the insertion of RST and maintaining a high compression rate.

In order to attain the above object, an image compressing apparatus according to a first aspect of the present invention employs an image compression/expansion method and includes restart marker insertion position setting means. The image compression/expansion method has a format which enables, by inserting a restart marker into data stream of the compressed image data in an arbitrary interval in advance, a normal expansion operation from the minimum coded unit (MCU) which is a minimum processing unit of image data for conducting the next image compression processing of the restart marker even when data error is occurred and data is broken. The restart marker insertion position setting means automatically set an insertion position of the restart marker to a head of a scanning line with least correlation between the two image data in a MCU unit for each interval of the scanning line which is an interval of the MCU unit to the scanning line which is arbitrarily set.

In order to attain the above object, an image compressing apparatus according to a second aspect of the present invention employs an image compression/expansion method and includes a setting register group, an image compressing portion, a marker preparing portion, a marker adding portion and a restart interval calculation portion. The image compression/expansion method has a format which enables, by inserting a restart marker into data stream of the compressed image data in an arbitrary interval in advance, a normal expansion operation from the minimum coded unit (MCU) which is a minimum processing unit of image data for conducting the next image compression processing of the restart marker even when data error is occurred and data is broken. The setting register group has a plurality of parameter setting registers for setting each of the plurality of the parameters including the image horizontal pixel number and a restart line interval for setting the restart marker in a scanning line interval that is an interval of the MCU unit. The image compressing portion which performs a discrete cosine transformation processing and quantization of input image data and performs entropy compressing to prepare compressed image data while inserting the restart marker in a set interval of a restart marker. The marker preparing portion prepares markers including a restart interval marker showing an insertion position of the restart marker on the basis of set value of each register of the set register group and on a value of a restart interval. The marker adding portion adds each marker to the compressed image data prepared in the image compressing portion and outputting as the image data of the predetermined format. The restart interval calculation portion calculates the restart interval on the basis of the horizontal pixel number and the restart line interval of the image supplied from the set register group.

In the image compressing apparatus according to the second aspect of the present invention, the set register group can be constituted in such a manner that a horizontal size setting register for setting a horizontal pixel number of the image required for the compression operation and a restart line interval setting register for setting the restart marker line interval value are provided.

In the image compressing apparatus according to the second aspect of the invention, the image compression processing portion comprises a discrete cosine transformation portion for conducting the discrete cosine transformation processing, a quantization portion for conducting quantization of data which is subjected to the discrete cosine transformation, a restart marker insertion portion for inserting the restart marker to the output data of the quantization portion and an entropy compression portion for entropy compression processing of the data into which the restart marker is inserted.

In the image compressing apparatus according to the second aspect of the present invention, the marker preparation portion comprises a restart interval marker preparation circuit for preparing the restart interval marker on the basis of the value of the restart interval calculated in the restart interval calculation portion.

In the image compressing apparatus according to the second aspect of the present invention, the restart interval calculation portion can be constituted so as to be determine an MCU number per one scanning by dividing the horizontal pixel number with the horizontal pixel number of the MCU unit and multiplying the value of the restart line interval with the MCU number per one scanning line.

In order to attain the above object, an image compressing method according to third aspect of the present invention employs an image compression/expansion method having a format which enables, by inserting the restart marker into data stream of the compressed image data in an arbitrary interval in advance, a normal expansion operation from the minimum coding unit (MCU) which is a minimum processing unit of image data for conducting the next image compression processing of the restart marker even when data error is occurred and data is broken, the method characterized in that an insertion position of the restart marker is automatically set to a head of a scanning line with least correlation between the two image data in a MCU unit for each interval of the scanning line which is an interval of the MCU unit of the scanning line which is arbitrarily set.

In order to attain the above object, an image compressing method according to a fourth aspect of the present invention employs an image compression/expansion method having a format which enables, by inserting the restart marker into the data stream of the compressed image data in an arbitrary interval in advance, a normal expansion operation from the minimum coding unit (MCU) which is a minimum processing unit of image data for conducting the next image compression processing of the restart marker even when data error is occurred and data is broken, the method comprises a first step of setting a plurality of parameters including a horizontal pixel number of the images required for compression, and a restart interval; a second step of determining in calculation a restart interval value of he MCU unit from the image horizontal pixel number and the restart line interval set at the first step; a third step of preparing each marker in accordance with a predetermined format standard from each of parameters set at the first step and the restart interval value determined at step 2; a fourth step of starting the incorporation of the image data on the basis of each of the parameters set at the second step; a fifth step of conducting discrete cosine transformation for decomposing the image data incorporated at the fourth step to frequency coefficient; a sixth step of quantifying the discrete cosine transformation coefficient obtained at the fifth step in the direction of more actively a high frequency coefficient to which man's eye is insensitive; a seventh step of subsequently inserting the restart marker at an appropriate timing on the basis of the calculation result at the second step while subjecting to entropy compression quantization data obtained at the sixth step; and an eighth step of adding each of the marker obtained at the third step to the image data compressed at the fourth to seventh step as header information.

In the image compressing method according to the fourth aspect of the present invention, in the second step, the horizontal pixel number is divided by the MCU unit horizontal pixel number to determine the MCU number per one scanning followed by multiplying the restart line interval value.

DESCRIPTION OF THE PREFERRED EMBODIMENTS

Now, embodiments of the present invention will be explained in detail by referring to the attached drawings.

An image compressing apparatus and a image compressing method according to an embodiment of the present invention is applied to an image compression/expansion processing of JPEG method which is an international standard about the compression/expansion of a still picture which has been explained in the prior art, and is particularly applied to the image compression processing. In a format of the JPEG method, there is provided such a specification that image data can be normally expanded from the minimum coded unit (MCU) or the block next to the RST even in the case where data error is generated and data is broken in communication or the like by inserting the restart marker (RST) in an arbitrary interval in advance.

However, in the JPEG method, the direct current coefficient created with the discrete cosine transformation and quantization of the original image is subjected to the differential compression with the prediction coding, followed by entropy coding to heighten the compression rate. The insertion of the RST allows the independence of the data before and after the differential compression by temporarily suspending the chain of the differential compression and taking a difference with zero to enable the restart of the expansion. Thus, difference value of the direct current immediately after the insertion of the RST is enlarged. As a result, the compression rate is lowered.

Therefore, the image compressing apparatus and a image compressing method according to the embodiment of the present invention is characterized by heightening the compression rate at the time of the RST insertion by providing RST insertion position setting means. The RST insertion position setting means, in order to minimize a penalty of the reduction in the compression rate caused by the insertion of the RST, automatically sets the insertion position of he RST to the head of the scanning line with the least correlation between two piece of image data in the MCU unit for each interval of the scanning line which is an interval of the MCU unit of the scanning line which is arbitrarily set.

It should be noted that terms such as the compression/expansion processing of the JPEG method and the MCU, the block, the RST or the like has been explained in detail in the prior art. Therefor, an explanation thereof is not repeated here.

Figure 7:
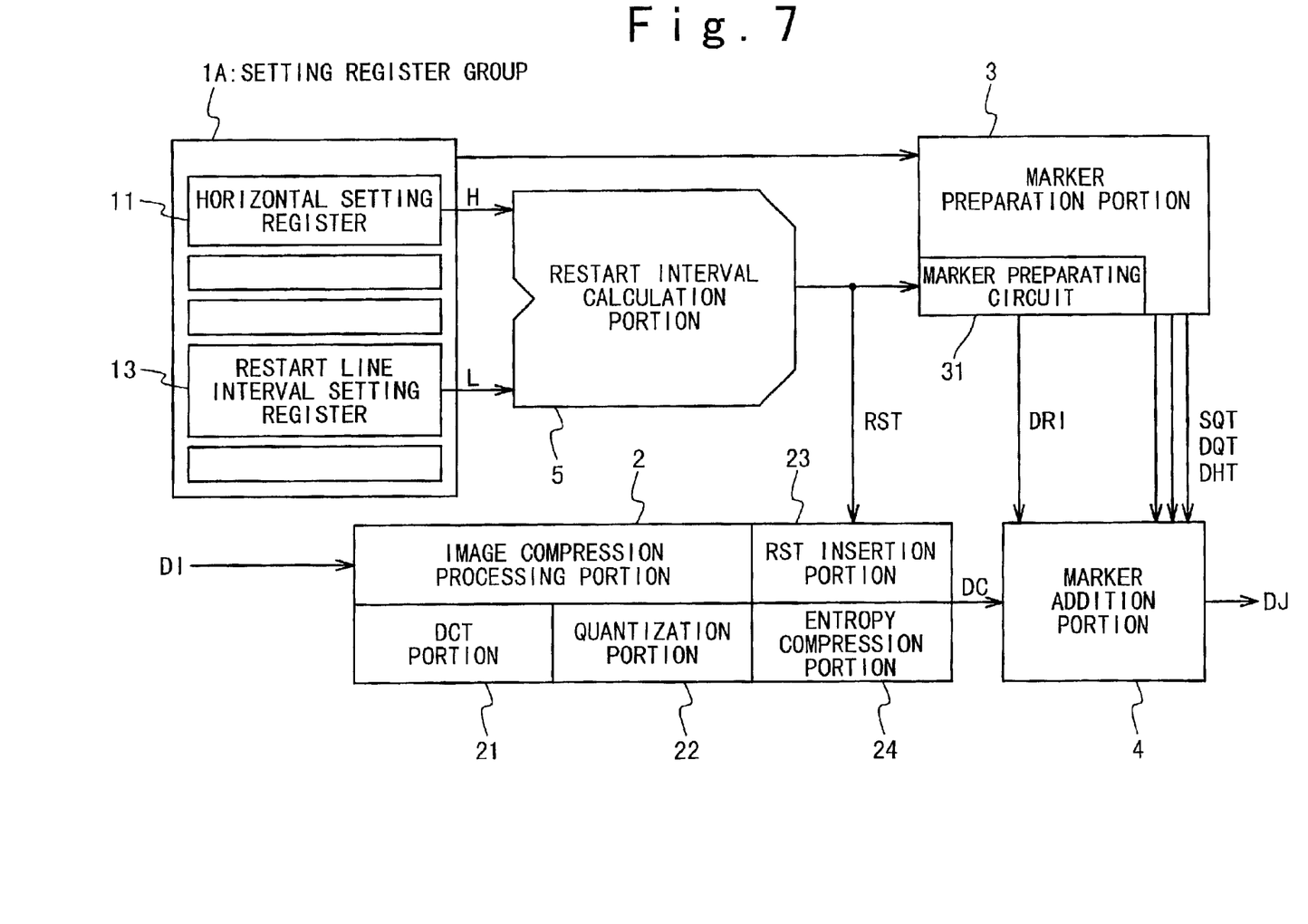
FIG. 7 is a block diagram showing an image compressing apparatus according to a first embodiment of the present invention.

Next, there will be explained an image compressing apparatus according to an embodiment of the present invention by referring to a block diagram shown in FIG. 7. This image compressing apparatus comprises an image compression processing portion 2, a marker preparation portion 3, a marker addition portion 4, a setting register group 1A and a restart interval calculation portion 5. A specification portion of the present invention is composed of the set register group 1A and a restart interval calculation portion 5.

The image compression processing portion 2, the marker preparation portion 3 and the marker addition portion 4 are common with the prior art. The image compression processing portion 2 executes entropy compression while inserting an RST in an interval set through the discrete cosine transformation (DCT) processing and quantization of the image data DI. The marker preparation portion 3 prepares each marker including a restart interval marker (DRI) for setting the insertion position of the RST on the basis of the set value of each register of the set register group 1A and a restart interval value (will be described later). The marker addition portion 4 adds each kind of marker to the compressed image data prepared at the image compression processing portion 2 and outputs the data as JPEG format image data DJ. The setting register group 1A includes parameter setting registers for respectively setting a restart line interval for setting the RST described later in a scanning line interval of the MCU unit instead of the setting register group 1 and parameters of the JPEG compression operation including a horizontal pixel number of images. The restart interval calculation portion 5 calculates the restart interval on the basis of the horizontal pixel number H of images supplied from the setting register group 1A and the restart line interval.

The setting register group 1A includes a horizontal size setting register 11 for setting the horizontal pixel number H of the image required for the compression operation, and a restart line interval setting register 13 for setting a line interval value of the RST.

The image compression processing portion 2 comprises a DCT portion 21 for conducting DCT processing, a quantization portion 22 for conducting quantization, a RST insertion portion 23 for inserting a restart marker (RST), and an entropy compression portion 24 for conducting entropy compression.

The marker preparation portion 3 comprises a marker preparation circuit 31 for preparing a DRI on the basis of the value of the restart interval value calculated with the restart interval calculation portion 5.

Next, referring to FIG. 7, there will be explained an operation of the image compressing apparatus according to embodiments of the present invention. In the beginning, predetermined values are set in setting registers including the horizontal size setting register 11 and the restart line interval setting register 13 of the setting register group 1A, respectively. That is, the horizontal pixel number H of the image required for the compression operation is set in the horizontal size setting register 11. In the restart line interval setting register 13, an interval value L of the restart line is set for setting the RST insertion interval in the unit of the scanning line (hereinafter simply referred to as a line) expressed in the MCU unit such as, for example, for each one (MCU) line or every two lines.

The restart interval calculation portion 5 calculates the RST insertion interval based on the horizontal pixel number H and the interval value L of the restart line, that is, the restart interval value Ri of the MCU unit and outputs the RST at a timing at which the RST is inserted and at the head of the set scanning line for each of the interval value L.

The restart interval value Ri is calculated by determining how many MCUs are required for the scanning of the horizontal image number H of the original image in the beginning, that is, determining the MCU number Hn per one scanning from the equation of "H÷horizontal pixel number Mh in MCU unit=Hn (rounded up)" followed by multiplying the restart line interval value L to the MCU number Hn per one scan (Ri =Hn×L).

It should be noted that because the MCU unit horizontal pixel number Mh used in this calculation refers to a horizontal pixel number included in one MCU unit, it is required to be considered in the sample ratio of each of the color components and scanning method. For example, the MCU unit horizontal pixel number in the case of the interleave method at the sample ratio of 4:4:4 is 8.

Next, the image compression processing portion 2 subjects the image data DI inputted at the DCT portion 21 to the DCT processing, and conducts quantization at the quantization portion 22. The entropy compression is conducted at the entropy compression portion 24 to output the compressed data DC while inserting into the data quantized at the RST insertion portion 23 the RST at the head of the scanning line, namely, at the timing of the RST insertion interval calculated at the restart interval calculation portion 5.

The marker preparation portion 3 prepares a plurality of kinds of markers on the basis of the set value of the setting register group 1A and the restart interval which is a calculation result of the restart interval calculation portion 5. That is, DRI preparation circuit 31 prepares the restart interval marker (DRI) on the basis of the calculated restart interval. Furthermore, the head marker SQT of the JPEG data stream regulated in the JPEG method signal format, the quantization table definition marker DQT, and a Huffman table definition marker DHT or the like are prepared, so that each of these created markers is supplied to the marker addition portion 4.

The marker addition portion 4 adds the markers including the DRI, SQT, DQT and DHT to the compressed image data DC prepared in the image compression processing portion 2 to be output as the JPEG format image data DJ.

Here, there will be explained the RST insertion position (timing) characterizing embodiments of the present invention. As shown in FIG. 3C which has been described above, the scanning order at the time of sampling the original image in the JPEG method is specified such that the original image is scanned horizontally from the left to the right in the scanning line (one line hereinafter) of the MCU unit, and when the right end is attained the scanning is lowered to a lower stage by one MCU unit, that is, one line portion and an operation of horizontally scanning from left to right for one line portion is repeated up to the end of the original image.

Here, the penalty degree of the reduction in the compression rate in accordance with the RST insertion position is explained by referring to FIG. 6 schematically showing the concept of the correlation of the DC coefficient in the case that the image data (hereinafter, image) of the one MCU unit is sequential. It is thought that the correlation of the DC coefficient showing an average value of the MCU unit of the images A and B in the case where the data continues in the two images A and B is generally high and the differential compression rate is also high. Thus, the penalty affecting the reduction in the compression rate becomes very high when the restart marker is inserted between the two images A and B.

However, like the image C, D, in the case of the image C at the end (the most right end) and the image D at the head (the most left end) of the next line (however, MCU unit), that is, two images spanning the line, the images are discontinuous even if the scan data order is continuous with the result that the correlation between DC coefficients is non-existent or considerably low. The compression rate in this case becomes extremely low. This fact shows that the penalty affecting the reduction in the compression rate becomes extremely small even when the RST is inserted between the images C and D with no correlation or with extremely low correlation.

Consequently, in this embodiment, the RST insertion interval is set in the line unit in which the correlation between the blocks (images) is most small, and the RST insertion position (timing) is set to the head of the line with the least correlation between the images.

As described above, the image compressing apparatus according to the embodiment of the present invention has such a function that when the arbitrary line interval of an RST is only set, the restart interval marker (DRI) is automatically added to the head position of the scanning line in the data stream of the JPEG image for each of this set line.

Figure 8A:
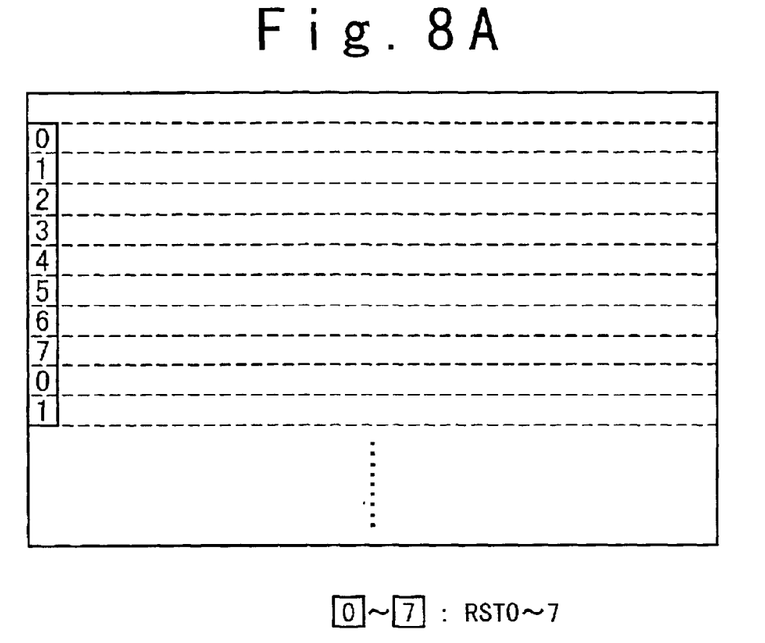
FIGS. 8A and 8B are explanatory views schematically showing a restart marker insertion position by the image compressing apparatus according to a first embodiment of the present invention.
Figure 8B:
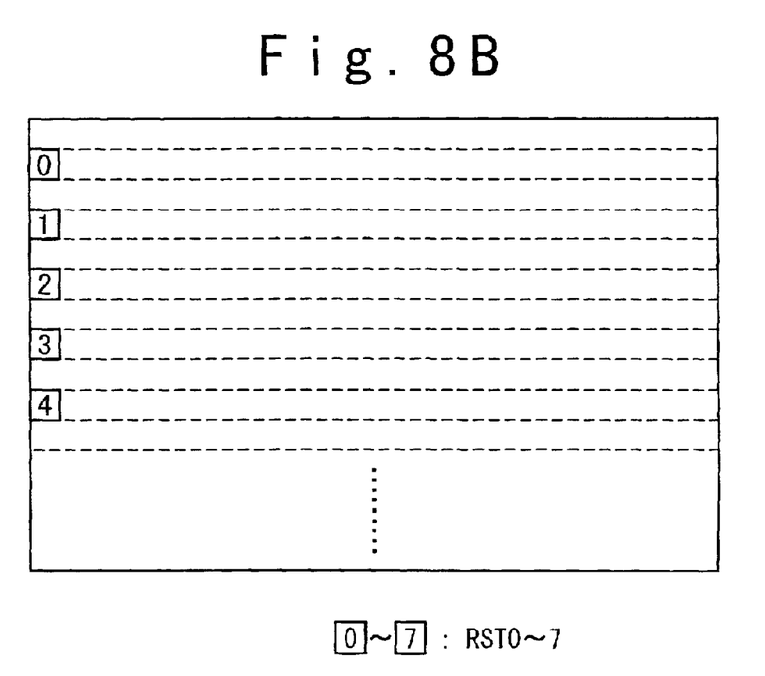

FIGS. 8A and 8B are views schematically showing the concept of the insertion position of the restart marker by the image compressing apparatus according to the embodiments of the present invention. FIG. 8A is a view showing a case in which "1" is set in the restart line interval setting register 13, the view showing a state in which RST is set at the head position of each line. Here, numeric values 0 to 7 denote the RST0 to 7 respectively.

In this case, the RST is inserted for each line, so that expansion can be normally conducted from the head of the next line even when data error is generated at the time of the image expansion at a certain line so that a normal expansion is prevented.

FIG. 8B is a view showing a case in which "2" is set to the restart line interval setting register 13. There is shown a state in which RST is set to the head position for each of two lines, namely, every two lines.

As has been explained in the prior art, 16 bits are required per one marker for the insertion of the RST. With respect to the compressed image which is compressed on the basis of the setting of the restart line for each of two lines, the insertion of the RST can be halved as compared with the compressed image based on the restart line interval setting for every one line, so that the data quantity becomes smaller and the compression rate can be improved.

However, in the case where data error is generated and a normal expansion cannot be conducted at the time of the image expansion at a certain line because RST is inserted only for every two lines (however, MCU unit), normal expansion cannot be resumed up to the head after two lines in the worst cases.

As describe above, it is possible to further reduce the data quantity of the compressed image by enlarging the value of the restart line interval setting register. For that portion, there arises a trade-off relation that a restoration interval becomes large until the expansion can be normally resumed from the occurrence of the data error.

In this manner, for improving a reduction in the compression rate of the DC coefficient at the time of the RST insertion, the image compressing apparatus according to this embodiment set the RST insertion interval in line unit, and set the RST insertion interval position at the head position of the line which can be regarded as having the least correlation between blocks thereby minimizing the penalty of the reduction in the compression rate and attempting to improve the compression rate at the time of the RST insertion.

Next, there is explained an example in which a improved value of the actual compression rate is predicted by distinguishing respectively the method into the interleave scan method (a method for subsequently scanning the color component in the MCU unit) and a subsequent scanning method (a method for subsequently scanning the image in each color component unit).

In the beginning, in the interleave scanning method, it is assumed that one color pixel is 24 bit signal which is composed of components of color signals R, G, and B or luminance color-difference signals Y, Cb, Cr or the like each of which components has eight bit (256 levels), the level of each component generally forms a normal distribution, and the average of the absolute value of the differential of the DC coefficient between continuous MCU is about 6.

Referring again to FIG. 6, the average Q of the absolute value of the differential of the DC coefficient in the case of the continuous images like the image data (hereinafter, image) A, B in the MCU unit is assumed to be "6" which is a small, and the average R of the absolute value of the differential of the DC coefficient in the case of spanning a line like images C and D is assumed to be 128 which is relatively large. Furthermore, it is supposed that the average value S of the differential of the DC coefficient at the time of the RST insertion is 128 with difference to 0.

The penalty PF in the case of the conventional RST insertion method is represented by the equation "PF=S−Q=128−6=122".

On the other hand, the penalty PE in the case of the RST insertion method in this embodiment is represented by the equation "PE=S−R=128−128=0".

Thus, the improvement effect IE per one pixel in the present invention is represented by the equation "IE=PF−PE=122−0=122" so that the average 122 level is improved as the differential value per one component of the DC coefficient.

At the time of Huffman coding of the differential value in actuality, the differential value is represented with a combination of a group number to which the differential value belong, and an addition bit in which a small value is given in order from small value of the DC differential value. Consequently, for example, in the case where the Huffman table is defined as "group number 3 (3 bits)+addition bit [110] (3 bits)=6 bits" with respect to value 6, and as "group number 8 (6 bits)+addition bits [10000000] (8 bits)=14 bits" with respect to the value of 128, the differential DC of the coding bit becomes DC=14−6=8 bits.

The improvement rate IF in this case is represented by the equation "IF={1−(6÷14))}×100=about 57%", so that it is expected that the improvement rate appears as a difference of about 8 bits per one restart (However, the above value changes in accordance with the setting of the Huffman table).

Consequently, in this case, the image compressing apparatus according to the embodiment on the present invention improves the reduction in the compression rate of the DC coefficient at the time of the RST insertion approximately by an average of 8 bits per one RST (the improvement rate is about 57%), so that the compression rate at the time of RST insertion is improved as a result.

Next, in the case of the subsequent scanning method, the original image is sampled one screen after another for each component of the image signal with the result that when one color pixel is set to 24 bits in the same manner as the case of the above interleave scanning method, the improvement effect IG per one pixel will become three times of the differential DC of the coded bit, namely 2IG=DC×3=8×3= 242 bits is provided.

In this case, the improvement rate IK will be "IK={1−(6×3)÷(14×3)}×100=about 57%". As compared with interleave scanning method, a large effect of three times (about 24 bits) in terms of bits can be obtained. It should be noted that the improvement rate of about 57% can be obtained at a relative ratio in the same manner.

Figure 9:
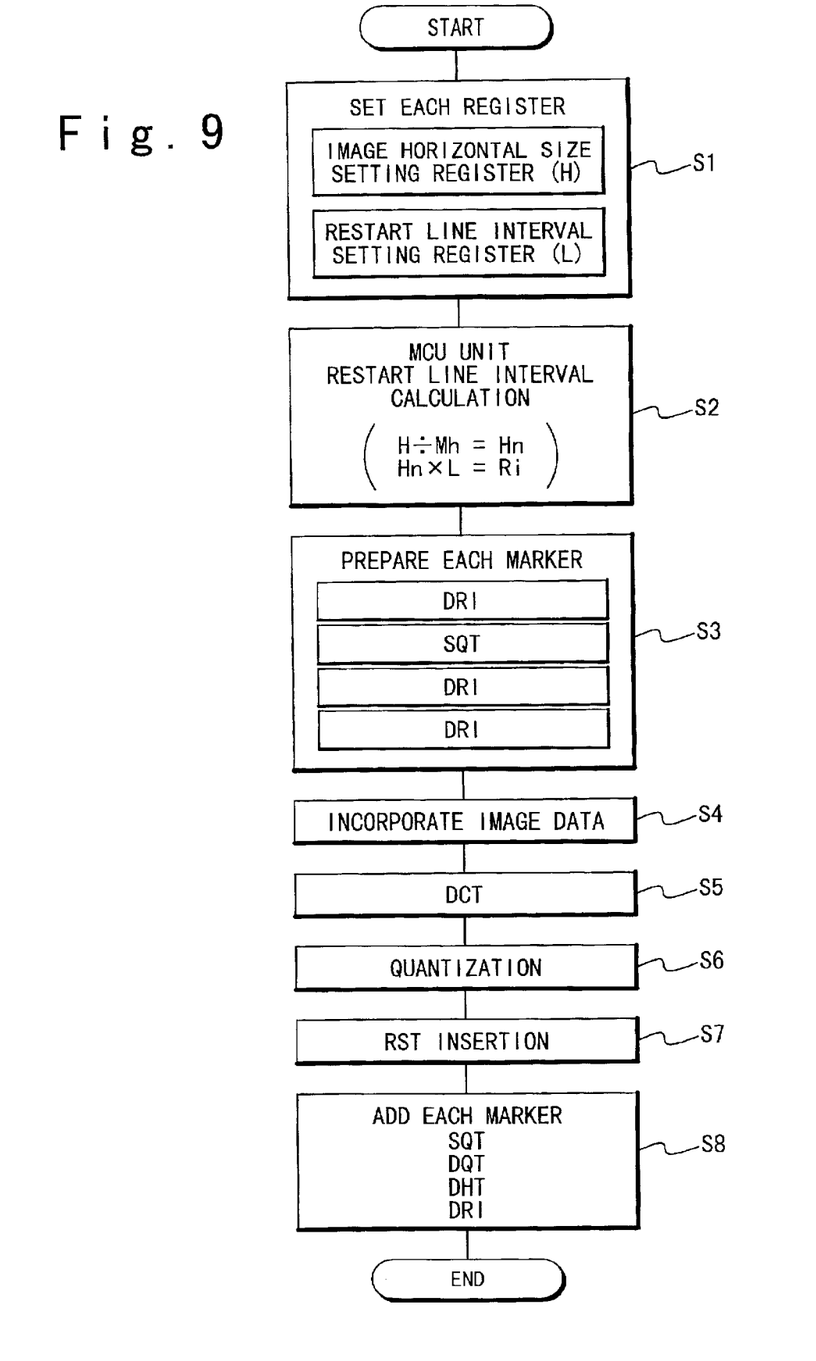
FIG. 9 is a flowchart showing an image compressing method according to a second embodiment of the present invention.

Next, an image compressing method according to a second embodiment of the present invention will be explained while referring a flowchart of FIG. 9. The image compressing method can be realized with a combination of a general purpose arithmetic unit (CPU or the like) and software except for the constitution of the image compressing apparatus according to the first embodiment with dedicated hardware.

In this embodiment, basically, the processing same as the image compressing apparatus according to the first embodiment is subsequently conducted to be suitable to software. Steps S1 to S3 execute a prior preparation for compression, and steps S4 to S8 execute an actual image compression processing.

First, after the start of the image compression, at step S1, parameters required for compression is set. The image horizontal pixel number H, the restart line interval L, the image sizes X and Y, each color component sample ratio (4:4:4 or 4:1:1), and the scanning method (subsequent scanning method, or interleave scanning method) or the like are set.

Next, at step S2, the restart interval value Ri of the MCU unit is determined in the calculation based on the image horizontal pixel number H and the restart line interval L out of the parameters set at the step S1.

That is, the restart interval value Ri is calculated by determining how many MCUs are required for scanning of the horizontal pixel number H of the original image in the beginning, namely determining the MCU number Hn per one scan from an equation of "H ÷MCU unit horizontal pixel number Mh=Hn (rounded up)" followed by multiplying the restart line interval value L to the MCU number Hn per one scan (Ri=Hn×L).

It should be noted that because the MCU unit horizontal pixel number Mh used in this calculation refers to a horizontal pixel number included in one MCU unit. Consequently, it is required to consider the horizontal pixel number in terms of the sample ratio and the scanning method. For example, the MCU unit horizontal number in the case of the interleave method becomes 8 at the sample ratio of 4:4:4.

Next, at step S3, each marker is prepared in accordance with the JPEG method format standard from each parameter set at step S1 and the MCU unit restart interval value Ri determined at step S2.

Next, at step S4, the incorporation of the image data is started on the basis of each of the parameters set in the processing at step S2.

Next, at step S5, in order to decompose the image data incorporated at step S4, discrete cosine transformation (DCT) is conducted.

Next, at step S6, the DCT coefficient data obtained at step S5 is quantized in a direction of more actively dropping a high frequency coefficient at which the sensitivity of man's eye is low.

Next, at step S7, while subjecting the quantization data obtained at step S6 to entropy compression, the RST (RST0 to RST7) is subsequently inserted at an appropriate timing on the basis of the calculation result obtained at step S2.

Next, at step S8, each marker obtained at step S3 is added to the image data compressed at step S4 to S7 as header information.

In the completion of step S8, the compressed image data that is JPEG compressed is completed.

With the above described image compression processing method, it is possible to realize the same function as the image compressing apparatus according to the first embodiment of the present invention.

As has been explained above, the image compressing apparatus and the image compressing method are capable of minimizing the penalty of the decrease in the compression rate and improving the compression rate at the time of the RST insertion by providing a RST insertion setting means for automatically setting the RST insertion position to the head of the scanning line with the least correlation between the two image data for each of the scanning line which is arbitrarily set so as to set the RST insertion interval in the line unit and setting the RST insertion position to the head position of the line which can be regarded as the presence of the least correlation between the blocks.

What is claimed is:

1. An image compressing apparatus comprising:

a restart line interval setting register which stores a scanning line interval that represents a number of lines for inserting a restart marker which indicates an expansion starting point of compressed image data at an occurrence of a data error;

a horizontal level setting register which stores a number of horizontal pixels of said image data;

a restart interval calculation portion which calculates a restart interval based on said number of horizontal pixels stored in said horizontal level setting register and said scanning line interval stored in said restart line interval setting register; and an image compression processing portion which compresses said image data after inserting said restart marker in a head of data corresponding to one scanning line of said image data based on said restart interval.

2. The image compressing apparatus according to claim 1, wherein said image compression processing portion comprises:

a discrete cosine transformation portion which executes a discrete cosine transformation to said image data;

a quantization portion which quantizes data from said discrete cosine transformation portion;

a restart marker insertion portion which inserts said restart marker in data outputted from said quantization portion; and an entropy compression portion which executes entropy compression of data in which said restart marker is inserted by said restart marker insertion portion.

3. The image compressing apparatus according to claim 2, further comprising:

a marker preparation portion which prepares a restart interval marker showing an insertion position of said restart marker based on a value which specifies a restart interval from said restart interval calculation portion; and a marker addition portion which adds the restart interval marker prepared by said marker preparation portion to compressed image data prepared by said image compression processing portion.

4. An image compressing method comprising:

storing a number of horizontal pixels of image data;

storing a scanning line interval which represents a number of lines for inserting a restart marker which indicates an expansion starting point of compressed image data at an occurrence of data error;

calculating a restart interval based on said scanning line interval and the number of said horizontal pixels; and compressing said image data after inserting said restart marker in a head of data corresponding to one scanning line of said image data based on said restart interval.

5. The image compressing method according to claim 4, wherein said compressing comprises:

executing a discrete cosine transformation to said image data;

quantizing data to which said discrete cosine transformation is executed;

inserting said restart marker in quantized data; and executing entropy compression to data in which said restart marker is inserted.

6. The image compressing method according to claim 5, further comprising:

preparing a restart interval marker showing an insertion position of said restart marker based on a value which specifies a restart interval; and adding the prepared restart interval marker to the compressed image data.

* * * * *